United States Patent [19]

Suzuki et al.

[11] 3,950,174

[45] Apr. 13, 1976

[54] ELECTRICALLY INSULATING COATING GLASS

[75] Inventors: Yoshiro Suzuki, Tokyo; Masahiko Ishiyama; Jiro Chiba, both of Yokohama, all of Japan

[73] Assignee: Asahi Glass Company, Ltd., Tokyo, Japan

[22] Filed: Apr. 22, 1974

[21] Appl. No.: 462,927

[30] Foreign Application Priority Data

Apr. 24, 1973 Japan ................................ 48-45699

[52] U.S. Cl. .................... 106/39.6; 106/53; 106/49

[51] Int. Cl.[2].... C03C 3/22; C03C 3/10; C03C 3/04

[58] Field of Search....................... 106/49, 53, 39.6; 117/124 A

[56] References Cited

UNITED STATES PATENTS

| | | | |
|---|---|---|---|
| 2,920,971 | 1/1960 | Stookey | 106/53 |
| 3,470,002 | 9/1969 | Di Marcello | 106/53 |
| 3,503,763 | 3/1970 | Mills | 106/53 |
| 3,700,471 | 10/1972 | Duke | 106/53 |

*Primary Examiner*—Winston A. Douglas
*Assistant Examiner*—Mark Bell
*Attorney, Agent, or Firm*—Oblon, Fisher, Spivak, McClelland & Maier

[57] ABSTRACT

An electrically isulating coating glass suitable for fusing or coating an electroconductive material in multilayer circuits which contains the following components:

| | percent by weight |
|---|---|
| $SiO_2$ | 25–48 |
| $Al_2O_3$ | 8–24 |
| PbO | 0.5–40 |
| $TiO_2$ | 5–25 |
| CaO | 4–20 |
| $ZrO_2$ | 0–5 |
| $ZrO_2+TiO_2$ | 5–25 |
| ZnO | 0–20 |
| PbO+ZnO | 0.5–40 |
| $Sb_2O_3$ | 0–3 |
| $Bi_2O_3$ | 0–3 |
| CdO | 0–3 |
| SrO | 0–3 |
| MgO | 0–3 |
| $PbF_2$ | 0–3 |
| $Bi_2O_3+CdO+SrO+MgO+PbF_2$ | 0–3 |

6 Claims, No Drawings

ELECTRICALLY INSULATING COATING GLASS

BACKGROUND OF THE INVENTION

1. Field of the Invention

This invention relates to an electrically insulating coating glass, and more particularly, it relates to an electrically insulating coating glass for fusing or coating an electroconductive material, especially a paste of an electroconductive powder, e.g., silver paste, which is used for the cross-over insulation required for multi-layer circuits, e.g., hybrid I.C.

2. Description of the Prior Art

An electrically insulating coating glass powder has been used for sealing, fusing or coating preformed products made of glass, ceramic and metal in addition to semiconductor elements, semiconductor parts or the like.

Integrated circuits, and displays are formed by screenprinting an electrically conductive layer, a resistance layer and an electrically insulating layer onto a substrate made of alumina or other non-conductor. To be suitable for use in an I.C., the electrically insulating layer should be easily screen-printable, have high insulation, low dielectric constant and low dielectric loss, should cause no flow of the printed pattern upon firing at a suitable firing temperature, should be inert to pastes of electroconductive powder and resistive powder, should impart no harmful affects to solder or soldered lead, should have a high density and high degree of flatness after printing and firing, should be highly adhesive to the substrate, and should possess high resistance to humidity.

Heretofore, the insulating layers have been made of crystalline glass of the $SiO_2$—$Al_2O_3$—PbO—$TiO_2$—BaO type, as disclosed in U.S. Pat. No. 3,586,522, or the $SiO_2$—$Al_2O_3$—PbO—ZnO—$B_2O_3$ type.

However, these conventional electrically insulating crystalline glasses are difficult to melt. They impart disadvantageous electrical characteristics, cause the printed pattern to flow easily because the glasses are of the surface devitrifiable type, and they have a low chemical durability.

A need exists therefore for an electrically insulating glass which will form an insulating layer with the desirable characteristics stated above.

SUMMARY OF THE INVENTION

Accordingly, one object of this invention is to provide a high density electrically insulating coating glass which is easily printable and which will not easily result in flow of the printed pattern, and which possesses high adhesiveness for the substrate.

There and other objects of this invention will hereinafter become more readily understood by the following description and can be attained by providing an electrically insulating coating glass with the following composition:

| | percent by weight |
|---|---|
| $SiO_2$ | 25–48 |
| $Al_2O_3$ | 8–24 |
| PbO | 0.5–40 |
| $TiO_2$ | 5–25 |
| CaO | 4–20 |
| $ZrO_2$ | 0–5 |
| $ZrO_2$+$TiO_2$ | 5–25 |
| ZnO | 0–20 |
| PbO+ZnO | 0.5–40 |
| $Sb_2O_3$ | 0–3 |
| $Bi_2O_3$ | 0–3 |
| CdO | 0–3 |
| SrO | 0–3 |
| MgO | 0–3 |
| $PbF_2$ | 0–3 |
| $Bi_2O_3$+CdO+SrO+MgO+$PbF_2$ | 0–3 |

DESCRIPTION OF THE PREFERRED EMBODIMENTS

Suitable electrically insulating coating glasses of the present invention have the following formulation:

| | percent by weight A | B | C |
|---|---|---|---|
| $SiO_2$ | 25–48 | 30–42 | 30–42 |
| $Al_2O_3$ | 8–24 | 10–20 | 10–20 |
| PbO | 0.5–40 | 1–25 | 2–10 |
| $TiO_2$ | 5–25 | 8–22 | 8–22 |
| CaO | 4–20 | 6–18 | 6–18 |
| $ZrO_2$ | 0–5 | 0–5 | 0–5 |
| $ZrO_2$+$TiO_2$ | 5–25 | 8–22 | 8–22 |
| ZnO | 0–20 | 0.1–15 | 0.1–15 |
| PbO+ZnO | 0.5–40 | 3–25 | 4–15 |
| $Sb_2O_3$ | 0–3 | 0.1–1 | 0.1–1 |
| $Bi_2O_3$ | 0–3 | 0–3 | |
| CdO | 0–3 | 0–3 | |
| SrO | 0–3 | 0–3 | |
| MgO | 0–3 | 0–3 | |
| $PbF_2$ | 0–3 | 0–3 | |
| $Bi_2O_3$+CdO+SrO+MgO+$PbF_2$ | 0–3 | 0–3 | |

The $SiO_2$ acts as a glass network former. If the quantity of $SiO_2$ is less than 25 percent by weight, vitrification will be difficult upon melting, crystallization will be facile upon heat treatment, and the softening point will be lowered so much that softening will occur before crystallization. If the quantity of $SiO_2$ is more than 48 percent by weight, the viscosity of the glass will be too high to conduct the melting and forming operations. Even though the melting and forming would still be possible, crystallization will be difficult to achieve at a suitable firing temperature (700°–900°C). Accordingly, a suitable range for the $SiO_2$ is 30–42 percent by weight.

The $Al_2O_3$ is an intermediate oxide which effects crystallization.

If the quantity of $Al_2O_3$ is less than 8 percent by weight, the crystallization will be difficult at a suitable firing temperature. If the quantity of $Al_2O_3$ is more than 24 percent by weight, the viscosity of glass will be so high as to be out of the vitrification range. Hence, a suitable range for the $Al_2O_3$ is 10 – 20 percent by weight.

The PbO acts as a flux, and the rate of crystallization is remarkably dependent upon the amount of PbO. If the quantity of PbO is less than 0.5 percent by weight, the viscosity of glass will be so high that the melting and forming operations will be difficult to perform at desirable firing temperatures. If the quantity of PbO is more than 40 percent by weight, the viscosity of glass will be too low, the printed pattern will be softened and will flow easily upon firing. In addition, crystallization will be difficult. Accordingly, a suitable range for the PbO is 1 – 25 percent by weight. If the quantity of PbO is less than 1 percent by weight, suitable crystallization will not result even if the printed pattern is fired at a suitable firing temperature (700°–900°C). If the quantity of PbO is more than 25 percent by weight, but less than 40 percent, the glass will sometimes react with the electrically conductive layer over which it is printed and fired. Hence, the optimum range of PbO is 2 – 10 percent by weight.

The $TiO_2$ acts as a nucleating agent for the crystallization. The optimum amount of $TiO_2$ will be dependent upon the main glass composition. If the quantity of $TiO_2$ is less than 5 percent by weight, crystallization will be difficult at a suitable firing temperature. If the quantity of $TiO_2$ is more than 25 percent by weight, crystallization and glass formation occur simultaneously. Even though vitrification will result, the number of nuclei will be too high, so that the growth of crystals is insufficient and flow will result upon firing. Accordingly, a suitable range for the $TiO_2$ is 8 – 22 percent by weight.

The CaO is an indispensible component for vitrification. If the quantity of CaO is less than 4 percent by weight, vitrification will be difficult at normal melting temperatures. If the quantity of CaO is more than 20 percent by weight, the glass will soften easily and will be hardly crystallized upon firing. Hence, a suitable range for the CaO is 6 – 18 percent by weight.

The above-mentioned components are indispensible components for forming the electrically insulating glass of this invention. However, superior characteristics can be achieved by adding the following components: The $ZrO_2$ acts to improve nucleation. If the quantity of $ZrO_2$ is more than 5 percent by weight, the viscosity of the glass will be too high, whereby uniform glass will be difficult to form. If the total quantity of $TiO_2$ and $ZrO_2$ is more than 25 percent by weight, a uniform glass will be difficult to form upon vitrification, and the number of nuclei will be too high, so that the crystallization will be inadequate. The optimum range of total $TiO_2$ and $ZrO_2$ is 8–22 percent by weight.

The ZnO acts as a flux agent and promotes crystallization. However, crystallization will be suppressed by adding only a small amount of ZnO. If the quantity of ZnO is more than 20 percent by weight, the glass will be difficult to vitrify upon the rapid cooling in the vitrification operation. Hence, a suitable range for the ZnO is 0.1 – 15 percent by weight.

The PbO may be substituted for ZnO in the coating glass of this invention without negatively affecting the soldering characteristics of a conductive layer printed over or under an insulating layer made of said glass, without negatively affecting the crystallizing characteristics of the said electrically insulating coating glass. The total weight of PbO and ZnO should not exceed 40 percent by weight. If the total quantity of PbO and ZnO is more than 40 percent by weight, the viscosity of the glass will be too low and the printed pattern will flow easily. The preferably range for the total PbO and ZnO is 3 – 25 percent by weight. The optimum range for the total PbO and ZnO is 4 – 15 percent by weight.

The $Sb_2O_3$ acts as a refining agent. The refining effect will not be further improved by adding more than 3 percent by weight. If $Sb_2O_3$ is present in more than 3 percent by weight, simultaneous undesired crystallization and glass formation sometimes occur. The $Sb_2O_3$ also acts to promote crystallization by forming crystals of $CaO.Sb_2O_5$ or $ZnO.Sb_2O_5$. A suitable range for the $Sb_2O_3$ is 0.1 – 1 percent by weight.

The electrically insulating coating glass powder of this invention may be prepared as follows:

The above-mentioned components are mixed to form a glass batch, which is melted. In general, a homogeneous molten glass will result by heating at temperatures higher than 1500°C. However, a uniform glass can also result by melting at temperatures lower than 1500°C. Various methods for crushing the resulting glass may be employed. It is preferable to form glass plate having a thickness of less than 0.5 mm and to crush the thin glass plate under anhydrous conditions to form glass powder having a maximum diameter below 20$\mu$.

The coating process utilizing the electrically insulating coating glass powder of this invention is illustrated below:

To place the glass powder onto a coated substrate, said powder is mixed with a vehicle such as ethyl alcohol, starch solution, water, $\beta$-terpineol, or the like. Other suitable vehicles may be selected after considering vapor pressure, viscosity, and danger in handling.

The glass powder is mixed with the vehicle, and the resulting mixture is printed and dried by a conventional method. The mixture preferably is a paste prepared by admixing the vehicle and the glass powder in a ratio of about 25 – 35 : 75 – 65 by weight. The paste is preferably printed through a 200 – 250 mesh screen and is then dried at 100° – 150°C. The dried product is fired, the firing temperature can be relatively low to provide a suitable result. The dried product is kept at a firing temperature of 700° – 900°C, preferably 750° – 850°C to vitrify, form a bubble-free film, and finally to crystallize. The rate of approaching the firing temperature and the rate of cooling after crystallization are preferably 50° – 80°C/min., respectively.

When the electrically insulating coating glass of this invention is used for cross-overs, a paste of the said coating glass can be printed alternatively over or under a paste of electroconductive powder to form a multilayer. The firing can be carried out on each layer in turn or on the multi-layer as a whole. For example, a paste of the electrically insulating coating glass is printed upon a printed and dried paste of electroconductive powder, and then both layers are fired.

One of the most important aspects of this invention is that a crystallized glass film having a smooth surface and a high density and electrical insulating ability is formed at relatively low temperatures. Since it is unecessary to fire the film at high temperatures, the water resistance of the film will be excellent. The thermal expansion coefficient of the resulting crystallized glass is similar to that of the alumina substrate. Hence, the binding of the film to the substrate is especially strong. Furthermore, the glass is extremely stable and melting can be easily carried out.

Having generally described the invention, a more complete understanding can be obtained by reference to certain specific examples, which are included for purposes of illustration only and are not intended to be limiting unless otherwise specified.

EXAMPLE 1

The components shown in Table 1 were mixed to prepare glass batches. Each glass batch was kept melted at about 1450°C for 1 hour. The molten glass was pressed between a pair of rollers to form a thin plate having a thickness of about 0.5 mm. The thin plate glass was crushed for more than 24 hours in a pot mill made of alumina, so as to form a glass powder having maximum diameter less than 20 $\mu$ and average diameter 3 – 5 $\mu$.

The electrically insulating coating glass of the invention is applied as follows:

A vehicle consisting of 92 percent by weight of $\beta$-terpineol and 8% by weight of ethylcellulose was mixed with the glass powder prepared above in a ratio of 25 : 75 by weight, to form a paste. The paste was printed through a 200 mesh screen after a paste of electroconductive powder was printed and dried on an alumina substrate; the insulating paste was dried at 150°C for 1 hour. The printed alumina substrate was heated at a rate of 50°C/min to 750° – 850°C, was kept at the same temperature for about 10 minutes, and was cooled at a rate of 50°C/min. The properties of the electrically insulating coating glass, which thus crystallized, are shown in Table 2.

Rate of Change of Resistance of the Conductive Layer

A paste made of the glass powder of the invention was printed on an alumina substrate and a paste of an electroconductive powder (Ag Pd type was further printed on the printed paste. Both of the printed layers were dried, fired and cooled. The rate of change of resistance of the electroconductive layer was quite low. The glass of the invention thus has excellent characteristics for preventing increases in resistance of the electroconductive layer.

TABLE 1

| | Sample No. | | | | | | | | | | | | |
|---|---|---|---|---|---|---|---|---|---|---|---|---|---|
| Component | 1 | 2 | 3 | 4 | 5 | 6 | 7 | 8 | 9 | 10 | 11 | 12 | 13 |
| $SiO_2$ | 34.1 | 28.6 | 44.1 | 29.3 | 31.3 | 38.6 | 31.5 | 38.6 | 31.1 | 38.6 | 39.5 | 41.5 | 41.5 |
| $Al_2O_3$ | 19.3 | 19.4 | 11.4 | 16.6 | 15.6 | 11.2 | 13.6 | 12.2 | 9.8 | 15.4 | 16.4 | 16.4 | 17.4 |
| PbO | 20.0 | 20.0 | 14.0 | 21.0 | 20.0 | 31.0 | 25.0 | 31.0 | 30.0 | 25.0 | 3.0 | 10.0 | 5.0 |
| $TiO_2$ | 15.0 | 15.0 | 15.0 | 15.0 | 21.0 | 11.0 | 8.0 | 6.0 | 9.0 | 11.0 | 17.0 | 15.0 | 14.0 |
| CaO | 10.6 | 16.0 | 14.5 | 18.1 | 11.1 | 7.2 | 5.9 | 7.2 | 6.6 | 9.6 | 17.1 | 16.1 | 16.1 |
| $ZrO_2$ | — | — | — | — | — | — | — | 4.0 | — | — | — | — | — |
| ZnO | — | — | — | — | — | — | 15.0 | — | 12.5 | — | 7.0 | — | 5.0 |
| $Sb_2O_3$ | 1.0 | 1.0 | 1.0 | — | 1.0 | 1.0 | 1.0 | 1.0 | 1.0 | 1.0 | — | 1.0 | 1.0 |

The porosity, printability, flow of printed pattern, binding strength, and rate of change of electrical resistance of the conductive layer, of the glass of the invention were measured and compared with those of commercially available electrically insulating glass of the $SiO_2$—$Al_2O_3$—PbO—ZnO—$B_2O_3$ type and the $SiO_2$—$Al_2O_3$—PbO—$TiO_2$—BaO type.

Porosity

The glass powder was pressed to form a cylindrical tip having a diameter of 10 mm and a height of 10 mm. The tip was fired at each of the firing temperatures, and the apparent specific gravity of the tip was measured by the Arkkimedes method. The porosity was calculated from the ratio of the apparent specific gravity to the true specific gravity. As a result, the porosity of the tip made of the glass of the invention was within 3–10 percent.

On the contrary, commercial pastes made of glass of the $SiO_2$—$Al_2O_3$—PbO—ZnO—$B_2O_3$ type and the $SiO_2$—$Al_2O_3$—PbO—$TiO_2$—BaO type were washed to remove the vehicles; the glass powders were dried and pressed, and the porosity was measured as above. Even at the high firing temperature of 900°C, the porosity of the tip was 18 – 20 percent. It is thus clear that the density of the film made of the glass of the invention is superior to that of the glass in the commercial pastes.

Printability

The printed pattern obtained by screen printing was closely observed for cuts in the lines or clogging. The samples prepared using the glass of the invention had no cuts or clogging.

Flow of Printed Pattern

When a paste is printed, dried and fired, the resulting pattern will flow if the viscosity of the paste is not correct. In order to determine the tendency of the paste to flow or spread, the width of the lines and the diameter of the holes of the printed patterns were compared after drying the paste and after firing. The fired glass of the invention did not substantially flow and the degree of flow was less than 10μ in all cases.

Binding Strength

The binding strength between the alumina substrate and the printed and fired glass of the invention was measured by the following method. The coated glass film surface was scratched with a razor blade and the condition of the damaged film was observed. The films made of the electrically insulating coating glass of the invention had especially strong binding strength and no damage was found. When pastes made of commercially available glass powders were coated and fired at about 850°C, and similarly tested, some damage and peeling of the films were found. The data for typical samples of the electrically insulating coating glass are shown in Table 2.

Table 2

| Sample No. | 6 | 7 | 9 | 10 | 11 | 12 | 13 |
|---|---|---|---|---|---|---|---|
| Density ($g/cm^3$) | 3.47 | 3.86 | 3.92 | 3.30 | 2.97 | 3.10 | 3.01 |
| Thermal expansion coefficient ($\times 10^7/°C$) | 53.8 | 63.9 | 61.0 | 52.7 | 51.8 | 53.6 | 57.5 |
| Alkali concentration(%) | 0.030 | 0.020 | 0.020 | 0.036 | 0.020 | 0.027 | 0.020 |
| Firing temperature (°C) | 800 | 800 | 750 | 850 | 900 | 850 | 850 |
| Crystals | | | | $CaO.Al_2O_3.2SiO_2$ | | | |
| Dielectric constant(1 MHz) | 13.0 | 13.1 | 13.0 | 10.1 | 11.5 | 12.1 | 10.9 |
| Dielectric loss tangent (tan δ 1 MHz) | 0.0014 | 0.0007 | 0.0010 | 0.0014 | 0.0018 | 0.0016 | 0.0011 |

Table 2-continued

| Sample No. | 6 | 7 | 9 | 10 | 11 | 12 | 13 |
|---|---|---|---|---|---|---|---|
| Rate of change of resistance(%) | 14 | 6 | 18 | 11 | 3 | 10 | 7 |
| Porosity(%) | 3.5 | 8.2 | 9.8 | 8.2 | 12.0 | 9.6 | 6.5 |

Note:
Density: true density of sample
Alkali concentration: concentration of $Na_2O+K_2O+Li_2O$ in sample.

The use of the electrically insulating coating glass for the preparation of a cross-over may be illustrated as follows:

First, a paste of an electroconductive powder of the Ag-Pd type (fine particles of Ag and Pd admixed with a low melting glass powder and a vehicle to form a paste) was screen-printed through a 200 mesh screen in the form of strips having width of 1 mm and thickness of about 30$\mu$. The paste was dried at about 150°C for 1 hour. Second, a paste of electrically insulating coating glass (the electrically insulating coating glass was admixed with a vehicle composed of 92% $\beta$-terpineol and 8% ethyl cellulose in a ratio of 75 : 25 by weight to form the paste) was screen-printed through a 200 mesh screen in the form of squares having width of 1.25 mm and thickness of about 30$\mu$. The paste was dried at about 150°C for 1 hour.

Third, a paste of an electroconductive powder of the Ag-Pd type was screen-printed over the previously printed layer of electrically insulating coating glass through a 200 mesh screen in the form of stripes having width of 1 mm and thickness of 30$\mu$. The paste was dried for about 1 hour.

Fourth, the combined printed layers were fired at a rate of 50°C/min, were kept at about 800° – 900°C for 10 minutes and then were cooled at a rate of 50°C/min to produce a cross-over.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An electrically insulating crystallized coating glass composition which contains $CaO.Al_2O_3.2SiO_2$ crystals consisting essentially of:

| | percent by weight |
|---|---|
| $SiO_2$ | 25–48 |
| $Al_2O_3$ | 8–24 |
| PbO | 0.5–40 |
| $TiO_2$ | 5–25 |
| CaO | 4–20 |
| $ZrO_2$ | 0–5 |

-continued

| | percent by weight |
|---|---|
| $ZrO_2+TiO_2$ | 5–25 |
| ZnO | 0–20 |
| PbO+ZnO | 0.5–40 |
| $Sb_2O_3$ | 0–3 |
| $Bi_2O_3$ | 0–3 |
| CdO | 0–3 |
| SrO | 0–3 |
| MgO | 0–3 |
| $PbF_2$ | 0–3 |
| $Bi_2O_3+CdO+SrO+MgO+PbF_2$ | 0–3. |

2. The electrically insulating crystallized coating glass composition of claim 1 which consists essentially of

| | percent by weight |
|---|---|
| $SiO_2$ | 30–42 |
| $Al_2O_3$ | 10–20 |
| PbO | 1–25 |
| $TiO_2$ | 8–22 |
| CaO | 6–18 |
| $ZrO_2$ | 0–5 |
| $ZrO_2+TiO_2$ | 8–22 |
| ZnO | 0.1–15 |
| PbO+ZnO | 3–25 |
| $Sb_2O_3$ | 0.1–1 |
| $Bi_2O_3$ | 0–3 |
| CdO | 0–3 |
| SrO | 0–3 |
| MgO | 0–3 |
| $PbF_2$ | 0–3 |
| $Bi_2O_3+CdO+SrO+MgO+PbF_2$ | 0–3. |

3. The electrically insulating crystallized coating glass composition of claim 2, wherein PbO is present to the extent of 2–10 percent by weight and PbO + ZnO is present to the extent of 4–15 percent by weight.

4. The electrically insulating crystallized coating glass composition of claim 1, which when mixed with a suitable vehicle will form a paste for printing.

5. The electrically insulating crystallized coating glass composition of claim 1 which forms a printed insulating film upon firing a paste containing the said electrically insulating crystallized coating glass composition.

6. The electrically insulating crystallized coating glass composition of claim 1, which when coated on an electroconductive layer will form a cross-over insulation.

* * * * *